Figure 1:
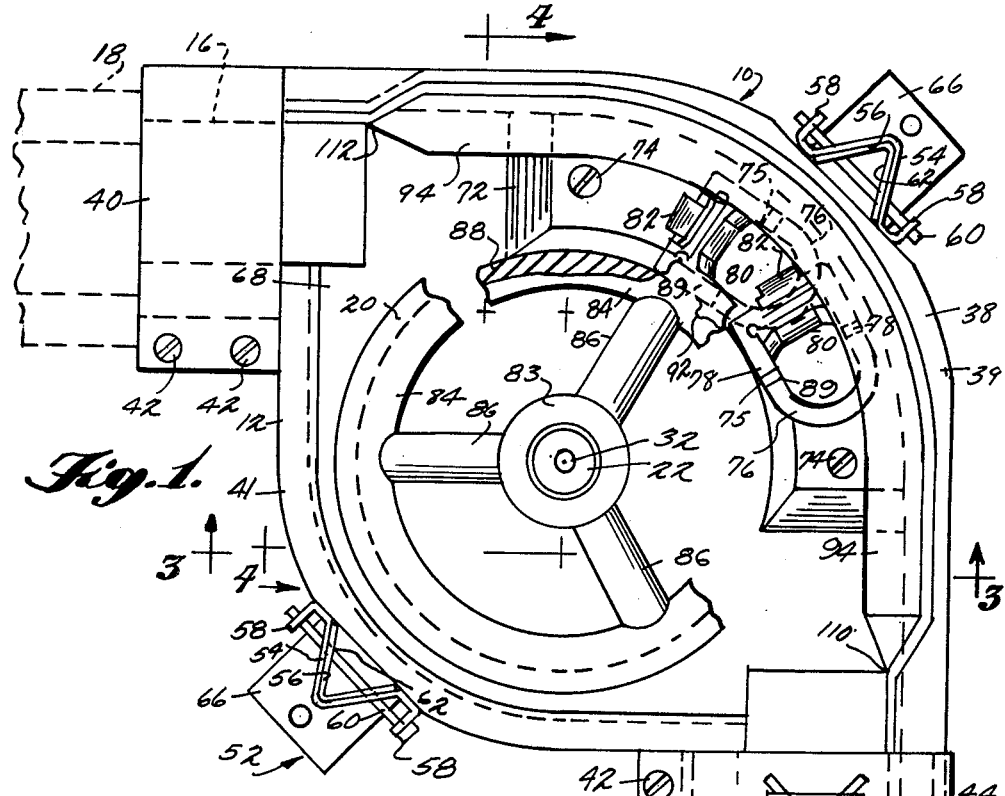

Nov. 17, 1964  W. W. ROBINSON, JR., ETAL  3,157,273
CORNER DIRECTION CHANGER
Filed Jan. 25, 1963  4 Sheets-Sheet 1

INVENTORS
WILLIAM W. ROBINSON, JR.
BY DEMPSIE C. CAMP

Cushman, Darby & Cushman
ATTORNEYS

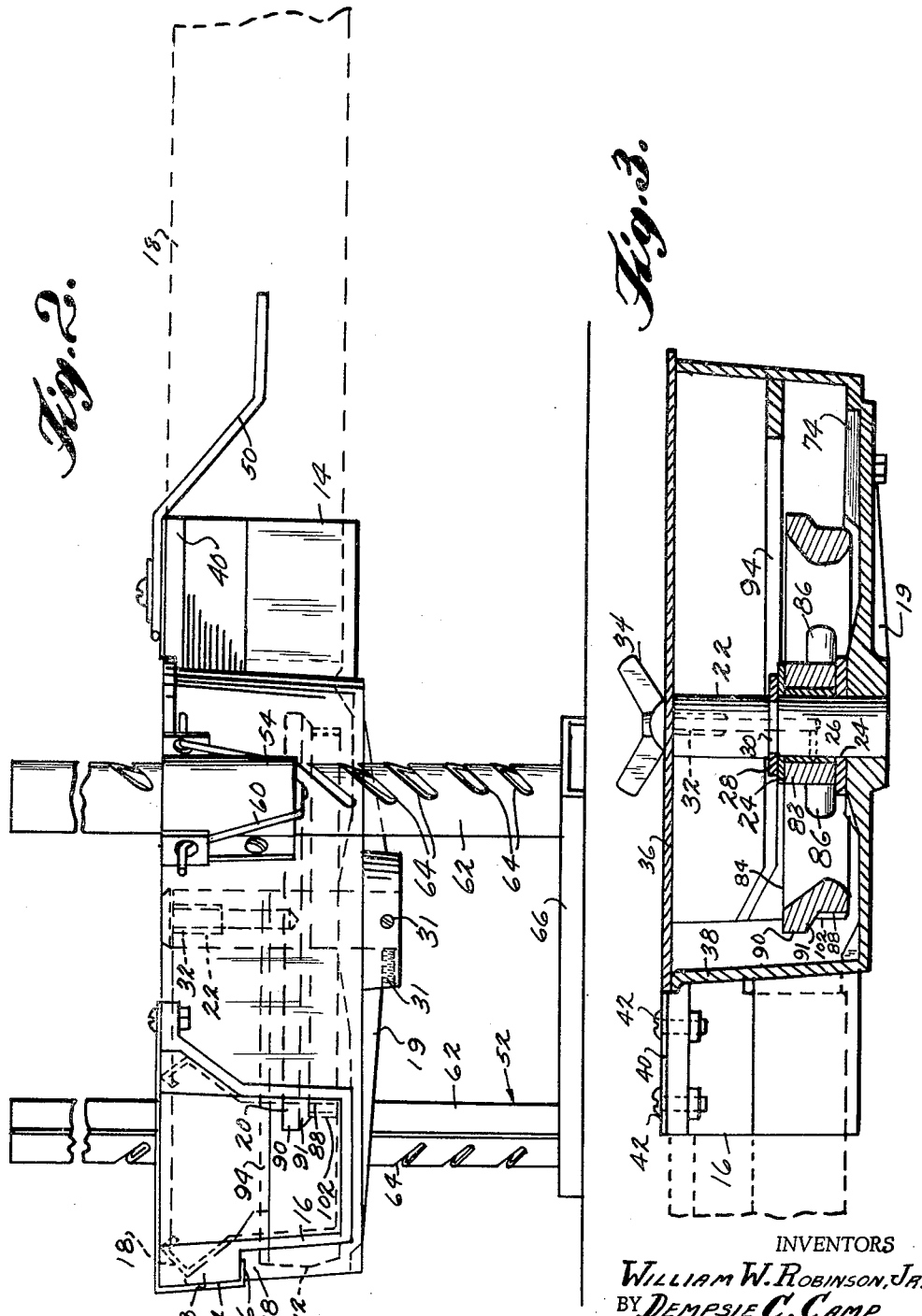

Nov. 17, 1964   W. W. ROBINSON, JR., ETAL   3,157,273
CORNER DIRECTION CHANGER
Filed Jan. 25, 1963   4 Sheets-Sheet 4
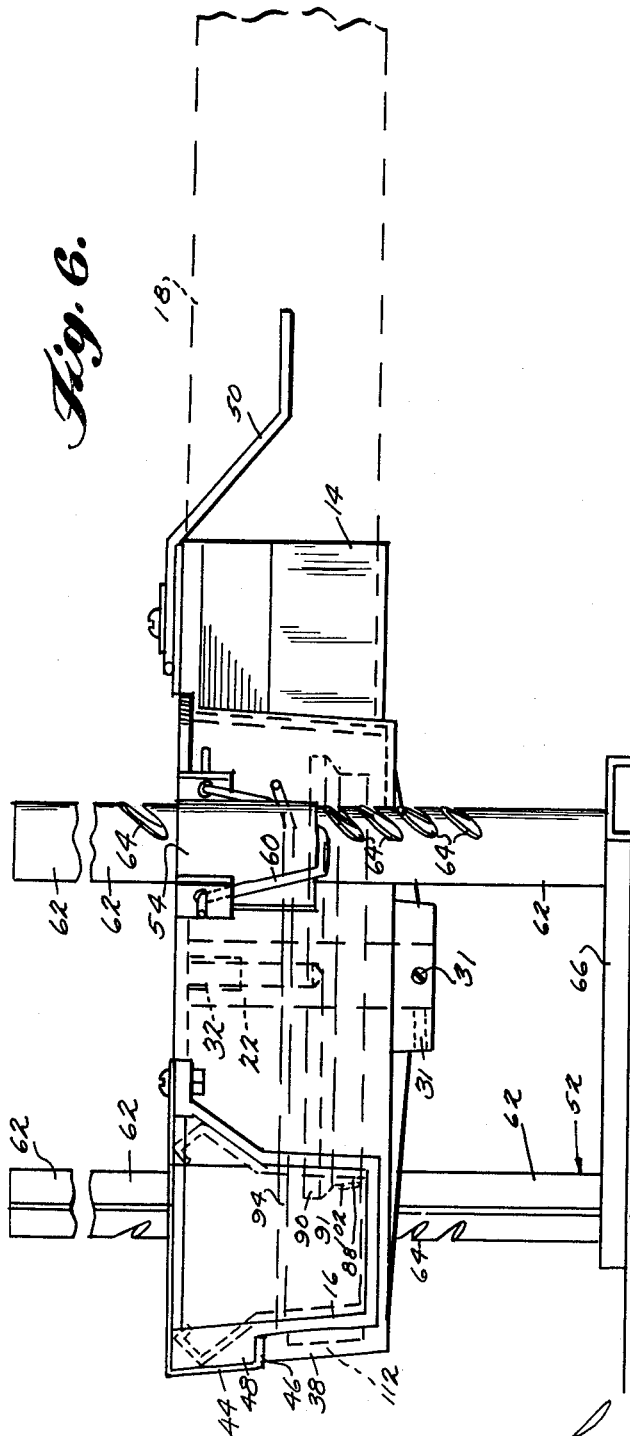
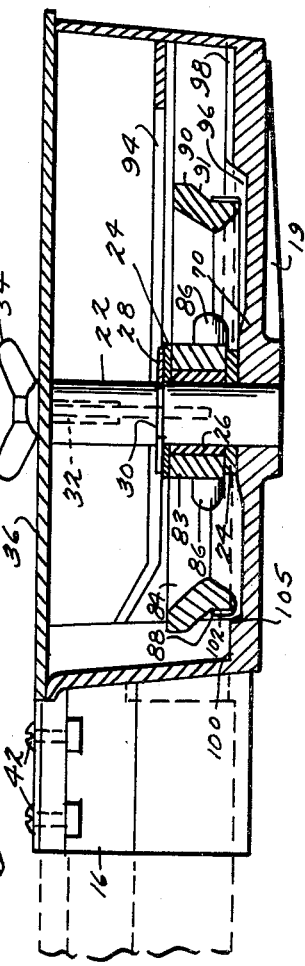
INVENTORS
WILLIAM W. ROBINSON, JR.
BY DEMPSIE C. CAMP
Cushman, Darby & Cushman
ATTORNEYS United States Patent Office 3,157,273
Patented Nov. 17, 1964

3,157,273
CORNER DIRECTION CHANGER
William W. Robinson, Jr., Signal Mountain, and Dempsie
C. Camp, Dunlap, Tenn., assignors to Cumberland
Case Company, Chattanooga, Tenn., a corporation of
Tennessee
Filed Jan. 25, 1963, Ser. No. 253,796
8 Claims. (Cl. 198—204)

The present invention relates generally to poultry feeders and more particularly to an improved corner direction changer assembly for mechanical poultry feeders.

Mechanical poultry feeders generally comprise a trough formed of several sections of shaped sheet metal. The several sections are suitably joined to one another as to be arranged in one or more closed loops or circuits. At a point where the loops are adjacent one another a suitable hopper is positioned over the troughs as to gravitationally supply feed to each trough. An endless conveying means such as a chain of interconnected links having bulldozing pushers formed thereon is positioned in and supported by each trough circuit. A suitable drive means is provided for the conveying chains. The drive means may comprise a sprocket gear drivingly interdigitated with the chain and secured to drive shaft turned by an electric motor.

At each point in the trough loops where it is necessary for the trough to shift direction, as to complete a closed loop, it has been customary to supply some type of direction changer assembly which would support the two adjacent trough sections and aid the conveying chain in turning the corner. Generally the chain aiding function has been performed by some type of wheel journalled in the direction changer assembly in a position such that the chain rolls about a portion of the periphery of the wheel.

Among the direction changers forming the prior art, none has been able to perform so satisfactorily as to be fault free. Included among their defects is their tendency to jam as when trash such as bits of corn cobs, wire or pebbles become wedged between the chain or wheel and the housing. In addition, the chain itself has a tendency to become wedged between the direction changer housing and the wheel mounted therein so that links of the chain become mangled and serious damage may be done to other portions of the conveyer unit.

An important defect inherent in corner direction changers of the prior art is that no provision has been made therein to retain the conveyer chain in a horizontal plane of movement during the lateral turn and therefore, because of the tension on the chain, the chain links ride upward angularly and may at times even flip upwardly over the guiding wheel. When the chain links begin their angular upward movement they cause a gap to be formed between themselves and the floor of the corner direction changer housing, thus allowing a portion of the poultry feed being conveyed to be dumped in the housing. When this unwanted angular displacement of the links continues for a short period of time the housing becomes packed with feed necessitating, at the least, a shut down of the conveyer so that the clogged corner direction changer can be freed. If the chain moves angularly upwardly as to flip over the guiding wheel, there is again danger that the chain will jam and break or cause damage to other portions of the conveyer system.

Some mechanical poultry conveyers have sought to obviate these difficulties by providing idler pulleys at the corners having teeth which interdigitate with the conveying chain, but systems of this type have proven unsatisfactory because the complicated configuration will not allow foreign matter such as shavings, corn cobs and the like to pass freely through the corner. Furthermore, the open mounting of such direction changer pulleys is undesirable in a poultry feeder in that it allows feeding chickens to become unwittingly enmeshed therein causing injury to the fowl and loss to the poultry man.

It is therefore an object of the present invention to provide a corner direction changer that will effect a lateral change of direction of a longitudinally advancing feed conveying chain while maintaining the chain in its horizontal plane of movement.

Another object of the present invention is to provide a corner direction changer assembly having an idler pulley located inwardly of a lateral direction change of a conveying chain as to have rolling contact with each link of the chain at vertically spaced points and effectively maintain the chain in a horizontal plane of longitudinal advance.

A further object of the present invention is to provide a corner direction changer assembly including an enclosed housing configured as to preclude the accumulation of trash within the housing and to prevent injury to feeding chickens.

Yet another object of this invention is to provide a corner direction changer assembly wherein the conveyer chain is effectively prevented from jamming between the idler pulley and housing of the assembly.

These and further objects of the invention and the entire scope thereof will become apparent from the following detailed description in which reference is made to the drawings attached hereto. It should be understood that the detailed description and specific examples set forth indicate preferred embodiments of the invention, but are given only for illustration and to impart a clear understanding of the invention, since various changes and modifications within the spirit and scope of the invention will be perceptible to those skilled in the art.

Figure 4:
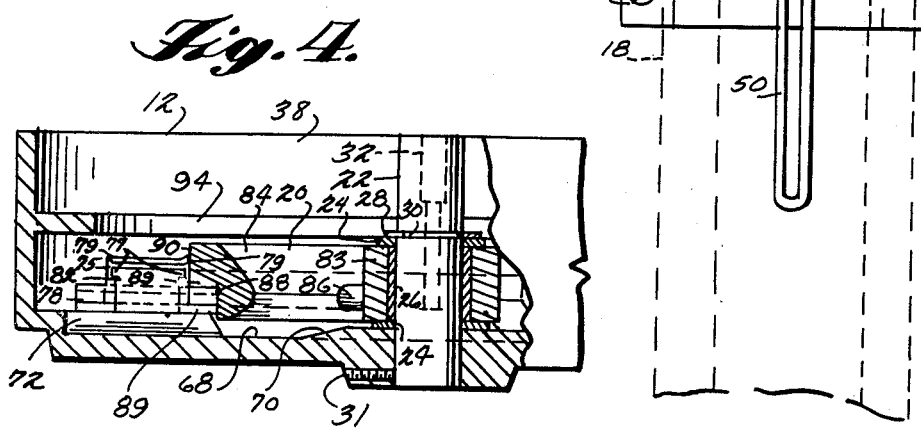
Figure 5:
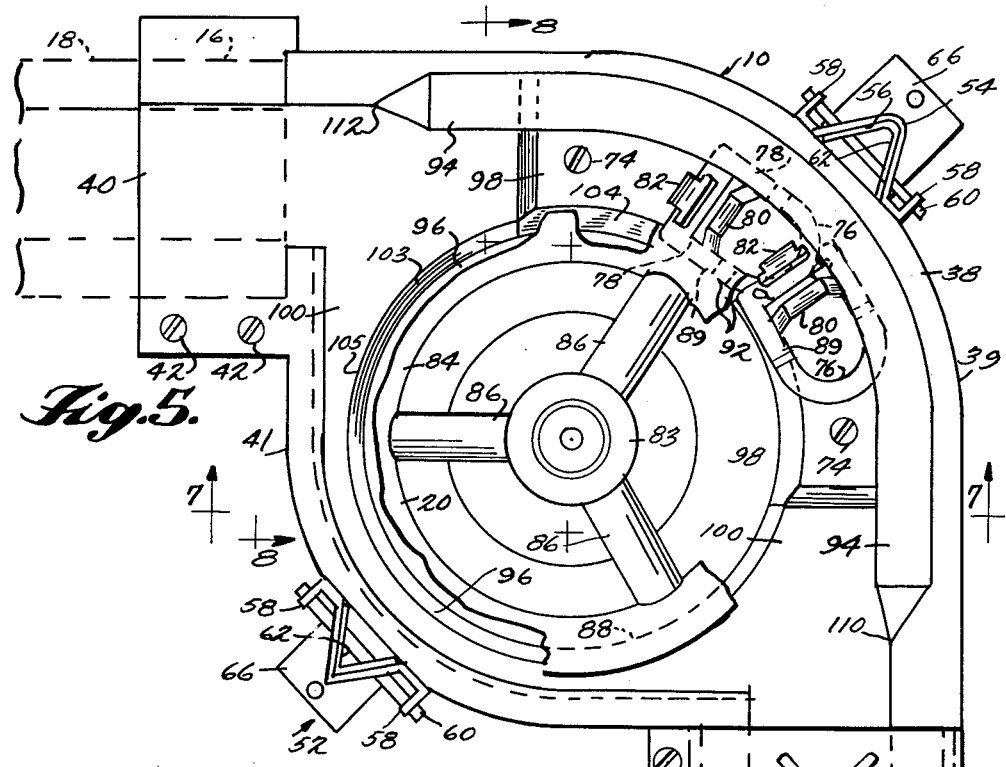
Figure 8:
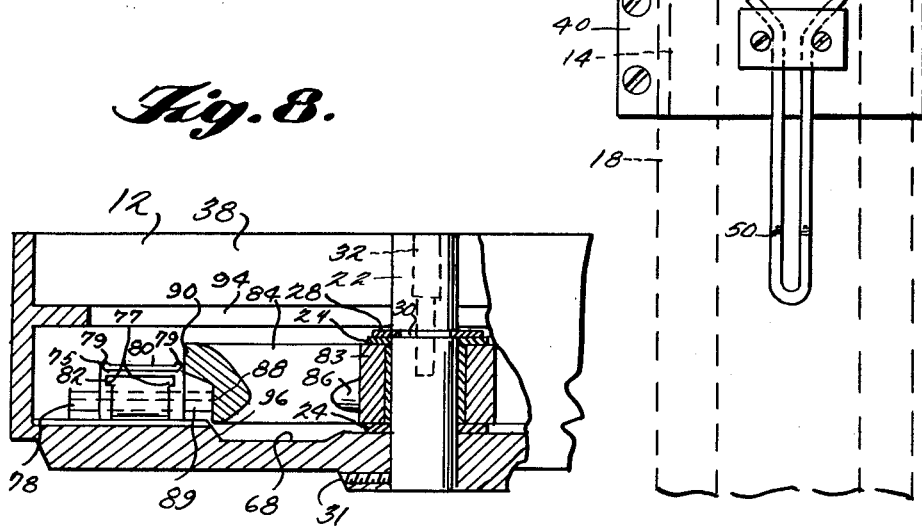

In the drawings:
FIGURE 1 is a top plan view of the invention;
FIGURE 2 is a side elevation view of the invention;
FIGURE 3 is a sectional view taken along line 3—3 of FIGURE 1;
FIGURE 4 is an enlarged fragmentary sectional view of the invention taken along line 4—4 of FIGURE 1 and showing the cooperation between a link of the chain and the idler pulley;
FIGURE 5 is a top plan view of a second embodiment of the invention partly broken away to expose the housing well;
FIGURE 6 is a side elevation view of the second embodiment;
FIGURE 7 is a sectional view taken along line 7—7 of FIGURE 5;
FIGURE 8 is an enlarged sectional view taken along line 8—8 of FIGURE 5 and showing the cooperation between a link of the chain and the idler pulley.

Referring now to the drawings in particular the numeral 10 generally indicates a corner direction changer assembly including an idler pulley housing 12 preferably cast with an entrance channel 14 and an exit channel 16 as to receive and support the ends of sections of feed trough 18. Radially extending strengthening ribs 19 may be integrally formed on the lower surface of the housing 12. In the embodiments shown the entrance and exit channels of the housing 12 are angularly disposed from one another as to support the two adjacent troughs 18 at right angles to one another in a horizontal plane. It must be realized however that it may be desirable in some applications to provide a housing adapted to receive troughs disposed at greater or lesser angles to one another than a right angle.

An idler pulley 20 having a novel configuration more fully set forth hereinafter, is mounted on a suitable axle 22 and journalled thereon as by brass washers 24 and a brass sleeve 26 forming the interior surface of the hub of the idler pulley. The idler pulley 20 is removably retained on the axle 22 as by an E-ring 28 frictionally engaging a circumferential slot 30 in the axle 22 as to be immediately superjacent the upper brass washer 24. The axle 22 is preferably secured to the housing 12 as by set screws 31. The upper end of the axle 22 is preferably drilled, then tapped and the axial cavity 32 thus formed is threaded for a short distance thereof. The cavity 32 provides an oil receiver for the idler pulley bearing and the threaded portion thereof receives a wing screw 34. The wing screw 34 removably secures a cover plate 36 on the housing 12 as to contact the sidewall 38 of the housing and the upper end of the axle 22.

The troughs 18 are secured to the entrance and exit channels 14 and 16 as by trough clamps 40. Each clamp 40 is provided at one lateral edge with apertures to receive a suitable fastening means such as screws 42. The opposite lateral edge of each clamp 40 is preferably provided with a downwardly extending flange portion 44 which flange carries a lip 46 which is angularly disposed to the flange 44 and will be vertically spaced from the upper surface of the clamp 40. The flanges 44 and lips 46 are provided in order to operatively engage cooperating projecting portions 48 on entrance and exit channels of the corner housing 12. It is, of course, obvious that rather than provide the flange and lip portions 44 and 46 apertures similar to those provided in the other lateral side may be provided instead. A substantially U-shaped chick guard 50 is preferably mounted on the trough clamp 40 surmounting the entrance channel 14 as to project downwardly and outwardly therefrom a substantial distance into the trough 18 preventing chicks from unwittingly entering the housing 12 and being injured therein.

The novel corner direction changer can be supported by an adjustable leg and bracket assembly 52. As shown, sheet metal brackets 54 are secured to diagonally opposite portions of the exterior sidewall of the housing 12 as to provide vertically directed openings 56 and outwardly projecting ears 58, each having a pivotable bail 60 secured thereto. The leg portion of the assembly 52 includes a pair of elongated channel members 62 having a plurality of upwardly and outwardly extending vertically spaced notches 64 formed partially therethrough. The legs 62 are spaced from one another by a floor engaging brace 66 secured to the lower end of each leg 62. In use the corner direction changer assembly 10 is positioned over the leg assembly and lowered so that the legs 62 enter the openings 56. When the assembly 10 is at the desired trough height the bails 60 are directed into the appropriate notches 64 and the assembly 10 is held in position thereby.

It would of course be possible to provide non-adjustable legs but this would not provide the flexibility desired for use with growing poultry and the individual preferences of poultry men. As shown, the leg assembly 52 is preferably positioned as to bisect the angle between the adjacent trough sections 18 as we have found that this configuration is most stable.

In certain applications it may be more desirable to suspend the troughs and corner direction changers rather than giving support by way of the leg assemblies shown. It is contemplated that, in this case, suspending wires may be attached to the bails 60 or that other modified suspending brackets be employed.

In the embodiment of the invention shown in FIGURES 5, 6, 7 and 8, the housing floor 100 is provided with an annular recess 96 located concentrically with respect to the axle 22 and adapted to operatively receive the lower edge of the peripheral lower chain engaging surface 88 of the idler pulley 20. As best seen in FIGURES 5 and 7 the peripheral edge of the annular recess which has a radius slightly greater than the lower chain engaging surface 88 of the idler pulley 20, is formed by a raised floor portion 105 of the housing floor 100 and by the wear plate 98. The portion of the annular recess edge formed by the raised floor portion 105 is provided with a chamfer 103 which is adapted to meet a similar chamfer 104 provided on the inner edge of the wear plate 98. The upper chain bearing surface of the wear plate 98 will be seen in FIGURE 7 to be slightly raised above the raised floor portion surface 105. The floor portion of the housing lying within the annular recess 96 is provided with a slightly raised annular boss 70 located concentric to the axle 22. The annular boss 70 not only affords a strengthened portion for mounting the axle 22, but serves to resist the entry of foreign matter between the idler pulley and its bearing surfaces. Since the lower edge of the peripheral lower chain engaging surface 88 of the idler pulley 20 is received within the annular recess 96 the chain is precluded from working its way underneath the idler pulley and wedging between the housing floor and the pulley.

While the aforementioned direction changer housing construction described by reference to FIGURES 5, 6, 7 and 8 has been successfully employed on poultry feed conveying systems; the housing construction now to be described by reference to FIGURES 1–4 is preferred for reasons hereinafter to be set forth.

In the embodiment of the invention illustrated in FIGURES 1–4 it will be seen that the floor surface 68 of the corner direction changer housing 12 is substantially flat, lying in a generally flat single plane, as in the aforementioned embodiment a slightly raised annular boss 70 is provided concentric with axle 22 for the same purposes set forth previously.

An arcuate hard-metal wear plate 72 is positioned on the floor 68 as by screws 74. The wear plate 72 is located in line with the arcuate path between the adjacent feed troughs 18 as to support the conveyer chain links as they change lateral direction around the periphery of the idler pulley 20. The upper surface of the wear plate is higher than the lower edge of the periphery of the idler pulley 20 and the wear plate 72 is so arcuately adjacent the idler pulley that chain links are absolutely precluded from working their way between the idler pulley and the housing floor.

It should be noted that the wear plates 72 and 98 which receive the chain for sliding contact, hold the chain upwardly from the housing floor and receive most of the wear. The wear plate in each embodiment is easily replaceable when worn as by removing screws 74.

In the first mentioned embodiment described by reference to FIGURES 5, 6, 7 and 8 wherein a completely enclosed annular recess 96 is provided subjacent the idler pulley 20, foreign matter such as small rocks tends to gravitate into the annular recess since the floor thereof is the lowest portion of the system. Since the annular recess is a completely enclosed area, i.e., being bounded by the arcuate edges of the raised floor portion 105 and the inner edge of the wear plate 98, such foreign matter would accumulate and often ultimately work its way into the space between the lower edge of idler pulley and the arcuate edges of the housing or wear plate and thus lock or jam the idler pulley. The embodiment described by reference to FIGURES 1–4, completely alleviates all difficulty due to accumulation and trapping of foreign matter in the area subjacent the idler pulley. It will be seen that in this embodiment the floor area of the housing 12 subjacent the idler pulley lies in the same flat plane as the surrounding portions of the housing floor and is in free communication with the exit channel 16 of the housing 12. Such a construction provides a "self-cleaning" operation, since foreign matter which might enter the area subjacent the idler pulley will, by virtue of the rotation of the idler pulley, tend to be drawn toward the exit channel area of the housing and away from the area subjacent the idler pulley.

The corner direction changer of the invention is especially adapted for use in conjunction with such chains as those disclosed in our commonly assigned copending application Serial No. 181,584, filed March 22, 1962, although its use with any similar conveying chain is within the purview of the invention.

As disclosed in the above mentioned application and shown in FIGURES 1, 4, 5 and 8 herein each link 75 of the chain comprises a U-shaped pintle portion 76 carried above the surface on which the link rides in a substantially horizontal plane. The legs 78 of the pintle portion extend forwardly and downwardly of the link and form the widest and traveling surface engaging portion of the link. The remainder of the link 75 includes a pintle receiving portion in the form of an upwardly and forwardly opening scroll-like member having the major axis transverse to the direction of travel of the link. As best shown in FIGURES 4 and 8 the rearmost, forwardly curving portion 80 of the pintle receiving portion is wider than the frontmost rearwardly curving portion 82.

As will be seen the links of the chain have a bi-planar configuration in that the pintle receiving portion and the forward portion of the legs are disposed in a lower supporting plane whereas the U-shaped pintle 76 is disposed in another plane above the lower supporting plane. The pintle receiving portion of each link 75 loosely receives the pintle portion 76 of the link preceding it, each link being operative for stable support solely by the lower supporting plane. As best shown in FIGURES 1, 4, 5 and 8 the foremost, rearwardly curving portion 82 of the pintle receiving portion carries a pair of transversely extending lugs 77 and the rearmost, forwardly curving portion 80 has the side ends 79 thereof flared outwardly. By virtue of this arrangement the links are easily assembled in loose engagement by simple manual manipulation, and are positively retained, after assembly in a flexible interconnected orientation.

The idler pulley 20 of the invention comprises a hub 83 and a rim portion 84 secured to one another by a plurality of integrally formed spokes 86. The idler pulley 20 is positioned for free rotational motion on the axle 22 as to be on the inside of the curve of the chain as the chain passes through the direction changer housing 12 and around the portion of the idler pulley 20 abutting the chain path.

The outer periphery of the idler pulley 20 includes a pair of vertically spaced, generally vertical chain engaging surfaces 88 and 90 separated from each other by an upwardly and outwardly projecting transition surface 91. The lower chain engaging surface 88, being the one of lesser diameter, engages the wider portion of the chain whereas the upper chain engaging surface 90, being that of greater diameter, engages the narrower portion of the chain. Using the chain 92, as illustrated, the rear member 80 of the pintle receiving portion on each link 75 is rollingly engaged by the upper chain engaging surface 90 and the lower chain engaging surface 88 rollingly contacts the inner leg 89 of each chain link 75. Because each link is supported at spaced vertical points as it rounds the corner in the direction changer assembly of the invention it is effectively impossible for the chain to rotate angularly upward and become detracked from the idler pulley. As an added preventive to chain roll-over a horizontal arcuate ridge 94 is provided on the inner surface of the outer portion of the housing sidewall 38. The ridge 94 projects inwardly a substantial distance over the chain path and is spaced a short distance above the chain so that the outer portion of the chain would engage the ridge should the chain roll angularly upward for any reason. The ridge 94 is particularly useful when the corner direction changer assembly 10 is being employed in association with conveying chains that do not have as effective spaced idler pulley engaging surfaces as those presented by the preferred chain link 75 as shown. A second purpose of the ridge 94 is to maintain the chain links in an orderly orientation if the chain should jam or break at some other point in the endless conveyer loop.

As best shown in FIGURES 1 and 5 the sidewall 38 includes a first wall 39 extending from the entrance channel 14 arcuately around the outer periphery of the chain path and terminates forming the outer wall of the exit channel 16. The sidewall 38 is completed by a second wall member 41 which extends from the entrance channel 16 arcuately around the rear of the idler pulley from the chain path and terminates forming the inner wall of the exit channel 16. The arcuate portion of the walls 39 and 41 are preferably configured as to have a common center of curvature coincident with the axle 22, the radius of the first wall being larger than the second by an amount substantially equal to the width of the chain path.

In each embodiment, it can be seen that the width of the chain path, which is but slightly wider than the width of the links at the entrance and exit channels, is widened in the portion of the wall 39 extending between 110 and 112 (FIGURES 1 and 5). This extra space provided for the chain at the area where the chain is contacting the idler pulley allows the chain to move outwardly when a piece of foreign matter temporarily gets between the chain and the idler pulley without jamming against the sidewall 39.

In both of the embodiments shown a plurality of spaced vertical ridges 102 are formed on the lower and transition surfaces of the idler pulley. The ridges 102 aid the chain links, when the chain is properly tensioned, to cause the idler pulley to turn, thereby evenly distributing wear over the outer periphery of the pulley and ensuring a substantially rolling rather than sliding contact between the chain and pulley.

The present invention as shown and set forth above will be seen to completely and effectively accomplish the objects as enumerated hereinabove. It should be understood that, although preferred embodiments of the invention have been shown in the drawings and described with considerable exactitude in the foregoing specification, the invention is not limited to the specific details and minutiae shown and described for clear understanding of the invention, but includes all modifications embraced by the spirit and scope of the following claims.

What is claimed is:

1. In combination with a mechanical poultry feed conveyer unit, a corner direction changer assembly adapted to effect the junction of adjacent angularly disposed trough lengths of said mechanical poultry feed conveyer unit and to effect a lateral direction change in the path of movement of an endless feed conveyer chain carried by feed trough lengths corresponding to the angular disposition of said adjacent trough lengths, said corner direction changer assembly comprising in combination a housing having a floor and upstanding sidewalls defining an entrance channel and an exit channel, an axle vertically positioned in said housing as to extend upwardly from said housing floor; an idler pulley journalled for free rotation on the axle within the housing, said idler pulley having a pair of vertically spaced substantially vertically directed chain engaging surfaces extending around the periphery thereof, the lower of the chain engaging surfaces being of lesser diameter than the upper chain engaging surface; an arcuate hard metal wear plate secured to the floor of the housing adjacent the idler pulley, the upper surface of the wear plate being slightly higher than the lower edge of the lower chain engaging surface of the idler pulley; and a conveyer chain of interconnected links passing into the housing through the entrance channel and having vertically spaced portions of each chain link engaging the vertically spaced surfaces of the idler pulley at the portion of the pulley periphery being substantially coextensive with the arcuate extent of the wear plate whereby said chain is retained in a transversely horizontal plane of movement during its lateral change of direction.

2. A corner direction changer assembly as set forth in claim 1 wherein each chain link comprises a wide substantially U-shaped pintle portion having a pair of transversely spaced legs extending forwardly and downwardly of the pintle portion and forming a part thereof and a narrower, pintle receiving portion comprising an upwardly and forwardly opening scroll-like member having the major axis thereof transverse to the direction of travel of the link, said scroll-like pintle receiving portion comprising a rear most forwardly curving portion and a slightly narrower foremost rearwardly curving portion, said pintle receiving portion being included between and secured to the pintle portion legs, a leg of each chain link being rollingly engaged by the lower of the idler pulley chain engaging surfaces and the rear most forwardly curving portion of the pintle receiving portion of each chain link being rollingly engaged by the upper of the idler pulley chain engaging surfaces during the movement of the conveyer chain through the corner direction changer housing.

3. A corner direction changer assembly as set forth in claim 1 additionally comprising means supporting the housing from a feeding area floor, said supporting means comprising a pair of brackets mounted on the exterior of the sidewalls of the housing on opposite sides thereof, each bracket being equidistant from the entrance and exit channels of the housing, each bracket defining a vertically directed opening therethrough adjacent the housing sidewalls, a bail pivotably secured to each bracket as to be swingable about a substantially horizontal axis, a pair of legs positioned as to be parallel and coextensive with one another and spaced from one another a distance substantially equal to the distance between the two bracket openings, a ground engaging brace extending between and rigidly secured to said legs, a plurality of vertically spaced upwardly and outwardly opening notches in said legs, whereby the legs may be passed through the bracket openings and the bails selectively engaged with one of the notches on each leg as to support the housing at a desired position from the feeding area floor.

4. A corner direction changer as set forth in claim 1 additionally comprising a horizontally extending arcuate ridge formed on the interior of the housing sidewall intermediate the upper and lower extent of the outer portion thereof, said ridge extending over the path of travel of the chain links a sufficient distance as to effectively preclude substantial upward rotational movement of said chain links during the lateral change in direction of said chain around the periphery of the idler pulley.

5. A corner direction changer assembly as set forth in claim 1 wherein the floor of the housing is substantially flat and an annular raised portion is formed thereon adjacent and substantially concentric the axle so that foreign matter is precluded from entry between said idler pulley and its bearing surfaces and a free path communicating with said exit channel is provided for such foreign matter subjacent said idler pulley.

6. A corner direction changer assembly as set forth in claim 1 additionally comprising means securing feed troughs to said entrance and exit channels.

7. A corner direction changer assembly as set forth in claim 1 which includes a housing cover surmounting said sidewalls and removably secured to said axle.

8. A corner direction changer assembly for a mechanical poultry feeder unit having adjacent angularly disposed trough lengths operatively carrying an endless feed conveyer chain, said corner direction changer assembly being adapted to effect the junction of adjacent angularly disposed trough lengths and to effect a lateral change in the direction of the path of movement of said endless feed conveyer chain corresponding to the angular disposition of said adjacent trough lengths, said corner direction changer assembly comprising in combination a housing having a floor and upstanding sidewalls defining an entrance channel and an exit channel, an axle vertically positioned in said housing as to extend upwardly from said housing floor; an idler pulley journalled for free rotation on the axle within the housing, said idler pulley having a pair of vertically spaced substantially vertically directed chain engaging surfaces extending around the periphery thereof, the lower of the chain engaging surfaces being of lesser diameter than the upper chain engaging surface; and an arcuate hard metal wear plate secured to the floor of the housing adjacent the idler pulley, the upper surface of the wear plate being slightly higher than the lower edge of the lower chain engaging surface of the idler pulley whereby said feed conveyor chain will pass into said housing through the entrance channel and be rollingly engaged by said vertically spaced chain engaging surfaces of said idler pulley so that said feed conveyor chain will be retained in its normal feed conveying disposition during said lateral change in the direction of its path of movement.

References Cited in the file of this patent
UNITED STATES PATENTS 2,591,609     Roberts et al. _____ Apr. 1, 1952
2,683,439     Markey _____ July 13, 1954